(12) United States Patent
Puhl

(10) Patent No.: US 9,071,440 B2
(45) Date of Patent: Jun. 30, 2015

(54) METHOD AND SYSTEM OF AUTHENTICATING THE IDENTITY OF A USER OF A PUBLIC COMPUTER TERMINAL

(75) Inventor: Larry C. Puhl, Tingee Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1578 days.

(21) Appl. No.: 12/341,357

(22) Filed: Dec. 22, 2008

(65) Prior Publication Data

US 2010/0161664 A1    Jun. 24, 2010

(51) Int. Cl.

| G06F 17/30 | (2006.01) |
|---|---|
| G06F 17/00 | (2006.01) |
| H04L 9/00 | (2006.01) |
| H04L 29/06 | (2006.01) |
| H04K 1/00 | (2006.01) |
| H04L 9/32 | (2006.01) |
| H04W 12/06 | (2009.01) |

(52) U.S. Cl.
CPC .......... *H04L 9/3231* (2013.01); *H04L 63/0861* (2013.01); *H04W 12/06* (2013.01); *H04L 2209/60* (2013.01); *H04L 2209/80* (2013.01)

(58) Field of Classification Search
CPC ..... G06F 21/57; G06F 11/00; G06F 11/1446; G06F 11/1612; G06F 15/17331; G06F 19/327; G06F 19/3412; G06F 19/3418; G06F 21/10; G06F 21/33; G06F 21/53; G06F 2211/1028; G06F 3/06; G06F 3/0604
See application file for complete search history.

(56) References Cited

U.S. PATENT DOCUMENTS

| 6,542,927 | B2 * | 4/2003 | Rhoads | 709/217 |
|---|---|---|---|---|
| 7,039,812 | B2 | 5/2006 | Kawan et al. | |
| 7,363,492 | B2 | 4/2008 | Kuhlman et al. | |
| 7,958,367 | B2 * | 6/2011 | Uesugi et al. | 713/178 |
| 7,966,384 | B2 * | 6/2011 | Marr | 709/219 |
| 7,983,420 | B2 * | 7/2011 | Ferlitsch | 380/255 |
| 8,316,237 | B1 * | 11/2012 | Felsher et al. | 713/171 |
| 2002/0050927 | A1 * | 5/2002 | De Moerloose et al. | 340/539 |
| 2003/0097573 | A1 * | 5/2003 | Wheeler et al. | 713/182 |
| 2003/0115475 | A1 | 6/2003 | Russo et al. | |
| 2003/0177071 | A1 * | 9/2003 | Treese et al. | 705/26 |
| 2003/0196084 | A1 * | 10/2003 | Okereke et al. | 713/156 |
| 2004/0025030 | A1 | 2/2004 | Corbett-Clark et al. | |
| 2004/0054913 | A1 | 3/2004 | West | |
| 2004/0128131 | A1 | 7/2004 | Campbell et al. | |
| 2004/0158716 | A1 * | 8/2004 | Turtiainen et al. | 713/172 |

(Continued)

*Primary Examiner* — Yicun Wu

(74) *Attorney, Agent, or Firm* — Byrne Poh LLP

(57) ABSTRACT

Methods for accessing private and public data via a public terminal are disclosed. With respect to accessing private content, a method for authenticating the identity of a user of the public terminal is disclosed. Unique identifiers are transmitted in a pre-defined area adjacent or nearby the public terminal and are monitored by a receiver. This information is utilized to electronically compile and update in real-time a list of identifiers that have recently been monitored by the receiver, and the list of identifiers is used to electronically create and update in real-time a temporary database including identity verification data corresponding only for identifiers in the list of identifiers. Identity verification data input into the public terminal by the user is compared with the set of identity verification data contained in the temporary database to determine whether or not there is a match of identity verification data. Access to private content via the public terminal is granted to the user if a match is found during the comparison. A method for displaying public data and a system by which these methods can be implemented are also disclosed.

20 Claims, 3 Drawing Sheets

(56) References Cited

U.S. PATENT DOCUMENTS

| | | | |
|---|---|---|---|
| 2005/0120246 A1* | 6/2005 | Jang et al. | 713/201 |
| 2005/0138394 A1* | 6/2005 | Poinsenet et al. | 713/186 |
| 2006/0022799 A1* | 2/2006 | Juels | 340/10.1 |
| 2006/0103534 A1* | 5/2006 | Arms et al. | 340/572.1 |
| 2007/0034691 A1* | 2/2007 | Davis et al. | 235/382 |
| 2007/0088950 A1* | 4/2007 | Wheeler et al. | 713/170 |
| 2007/0198848 A1* | 8/2007 | Bjorn | 713/186 |
| 2007/0288758 A1* | 12/2007 | Weiss | 713/186 |
| 2008/0002634 A1 | 1/2008 | Mock et al. | |
| 2008/0033637 A1 | 2/2008 | Kuhlman et al. | |
| 2008/0117048 A1 | 5/2008 | Rachwalski et al. | |
| 2008/0153515 A1 | 6/2008 | Mock et al. | |

* cited by examiner

METHOD AND SYSTEM OF AUTHENTICATING THE IDENTITY OF A USER OF A PUBLIC COMPUTER TERMINAL

FIELD OF THE INVENTION

A method and system for identifying and/or verifying an individual for purposes of permitting access to private or public content via a computer or like electronic terminal are disclosed, and more particularly, a method of promptly identifying an individual based on biometric verification or the like before granting access to private content on a computer or like electronic terminal that is available for use by the general public or other large group is disclosed.

BACKGROUND OF THE INVENTION

As used herein, the term "public terminal" means any computer, electronic interface or station, display, or like terminal that is available for temporary use by a relatively large group of individuals or users, such as the general public. Examples, of public terminals include, without limitation, public use Internet computer stations, electronic ticket booths, information or advertising displays, kiosks, ATM machines, electronic ordering stations, or any other electronic or computer based terminal or display that enables an individual to access some type of content and/or make an electronic transaction.

It is known to require an individual to first verify their identity before access is granted to a computer network or like private content via a publicly available computer terminal. Typical security approaches used on some terminals include the entry of usernames and/or passwords, swiping of magnetically-encoded cards or radio frequency identification tags adjacent a reader, or input of physical biometric data. An advantage of the use of biometrics, such as fingerprints, voice, hand geometric patterns, face geometric pattern, retinal patterns, etc., is that unlike usernames, passwords, cards and tags, biometrics cannot be shared or lost and are not easily stolen or duplicated. The use of biometric data is also convenient to the end user since they cannot be forgotten.

However, biometric identification is typically not used on terminals that are accessed by the general public or other large groups. This is because a large database potentially containing millions of possible candidates would need to be searched every time a single fingerprint or like biometric is input by a user. This requirement for such an extensive search undesirably adds complexity, cost, and an increase in overall transactional time. In addition, such a search is prone to error due to the length of the search and the millions of possible matches. Further, quick access to content or information is typically desired in a public terminal setting thereby rendering the use of biometric security measures impractical when the database of potential users is large.

SUMMARY OF THE INVENTION

With respect to accessing private content via a public terminal, this disclosure describes a method for authenticating the identity of a user of the public terminal. Unique identifiers being transmitted in a pre-defined area adjacent or nearby the public terminal are monitored by a receiver associated with the public terminal. This information is utilized to electronically compile and update in real-time a list of identifiers that have been recently received or detected by the receiver. The list of identifiers is used to electronically create and update in real-time a temporary database containing identity verification data corresponding only to the identifiers listed in the list of identifiers. The method includes the step of electronically comparing identity verification data input into the public terminal by an individual requesting use of the public terminal with the set of identity verification data contained in the temporary database to determine whether or not there is a match of identity verification data. Access to private content via the public terminal is granted to the individual user of the public terminal if a match is found during the comparison.

With respect to displaying public content with a public terminal, this disclosure describes a method for displaying information of interest to an individual positioned adjacent a public terminal. A receiver monitors for a unique identifier being transmitted in the immediate vicinity of the public terminal. The identifier is transmitted by a device carried and owned by an individual. A computer processor of the public terminal identifies information believed to be of interest to the individual based on the unique identifier detected. As a result, the information believed to be of interest to the individual is displayed on the public terminal.

According to another aspect of the disclosure, a system for authenticating the identity of a user of a public terminal is provided. The system includes a public terminal that is freely accessible by a large number of users, such as the general public. The public terminal includes a receiver for monitoring and detecting unique identifiers transmitted in a pre-defined area adjacent or nearby the public terminal. The public terminal also includes one or more computer processors that compile and update in real-time a list of identifiers recently monitored by the receiver, that create and update in real-time a temporary database including identity verification data corresponding only to the list of identifiers, and that compare identity verification data input into the public terminal by a user with the identity verification data contained in the temporary database to determine whether or not there is a match of identity verification data and whether or not access should be granted to the user to private content via the public terminal.

BRIEF DESCRIPTION OF THE DRAWINGS

The following drawings serve to illustrate the principles of the invention.

DETAILED DESCRIPTION OF THE INVENTION

Figure 1:
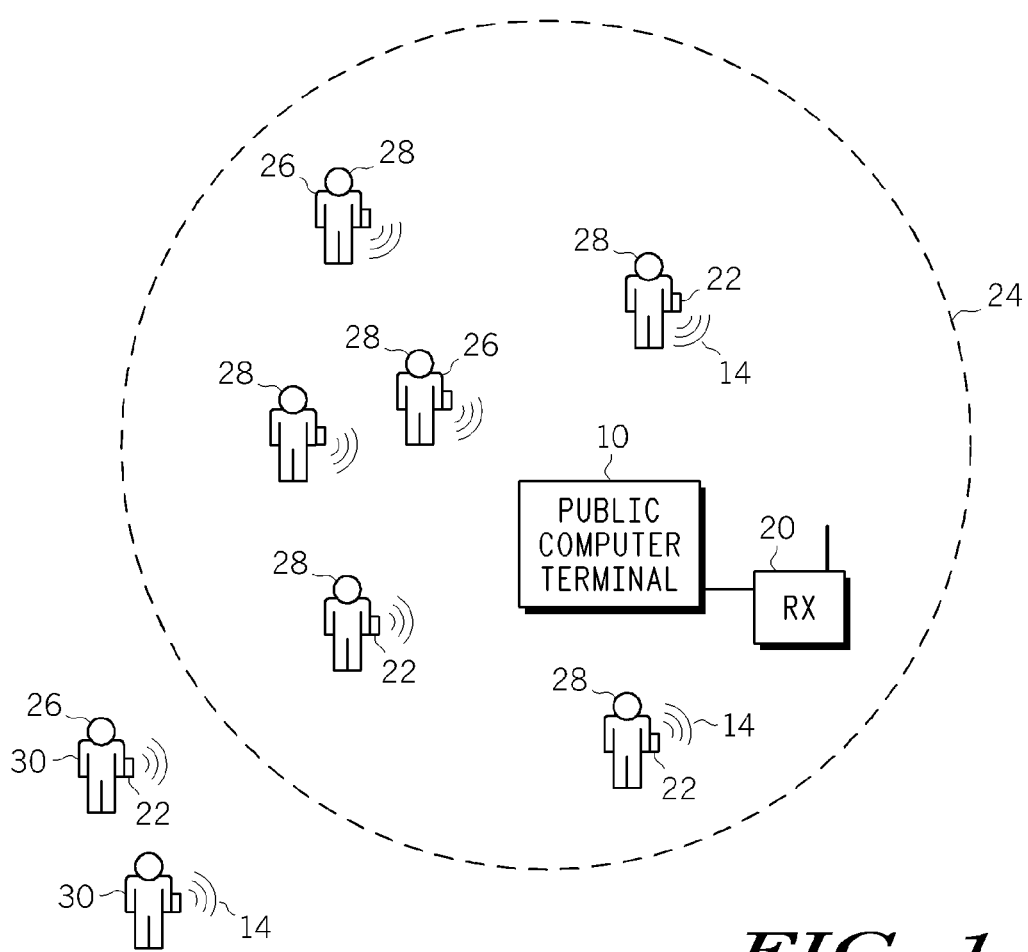
FIG. 1 schematically illustrates a first embodiment of a public terminal and pre-defined area in accordance with the principles of the invention.

As discussed above, the term "public terminal" refers to any computer, electronic device, interface terminal, display, or like station that is for use by anyone in the general public or by users in a relatively-large defined group of individuals. As an example, see public terminal 10 in FIG. 1.

The public terminal 10 may be for use in displaying public data, private data, or both. Examples include electronic terminals and displays at airports, transportation centers, shopping malls, buildings, stadiums, amusement parks, restaurants, stores, or any other location where a large number of people may congregate or pass. Typically, the terminal 10 will provide access to desired information or content, such as to a specific computer network, the Internet, account information, personal messaging, voicemail, or e-mail content, or any other type of information or content that may be required and/or useful in a public setting, such as an airport or the like.

With respect to private data or content, a user will typically be required to verify and authenticate their identity for security purposes before access is granted to the content via the public terminal 10. In this instance, the invention can primarily rely on the use of biometrics for verifying the user's identity with a high level of confidence. Examples include fingerprints, voice or speech recognition, retinal patterns, hand geometric patterns, face geometric patterns, or the like. Biometric data provides a preferred approach because such data will normally always be readily available, cannot be forgotten, lost, or shared, and is not easily stolen or duplicated. Of course, if desired, other security alternatives such as entry of username and/or passwords can be used in place of biometrics, or in addition to biometrics.

Assuming a biometric approach is used and since the terminal 10 is a public terminal, an individual that will ultimately desire access to private content via the terminal 10 is required, in advance, to input and enter their biometric information into a parent database 12 in association with a unique identifier 14. The parent database 12 contains biometric data of all potential users of the terminal 10. Since the terminal 10 is contemplated as being capable of use by thousands, hundreds of thousands, or a million or more individuals, the parent database 12 of biometric data is expected to be large and difficult to search in a timely and error-free manner due to its volume of stored information.

Accordingly, the process of identity verification of the invention includes a preliminary step of limiting any search for a biometric match to a subset or smaller list of candidates than that contained by the parent database 12. Thus, a biometric entry device 16 is associated with each terminal 10, and when an individual provides his/her fingerprint or like biometric to the terminal 10, the public terminal 10 searches for a match of fingerprint or like biometric data relative to data contained in a temporary database 18 of significantly reduced size relative to that of the parent database 12. This enables a match, or non-match, event to be quickly determined and permits access to be granted or denied in an amount of time (essentially instantaneous) acceptable to the general public in an environment in which a public terminal would likely be used.

For the above purpose, the terminal 10 has or is connected to a receiver 20 or like device that is capable of automatically monitoring, receiving and detecting identifiers 14 being transmitted from mobile devices 22 present in the immediate vicinity of the terminal 10 or within a defined area 24 adjacent or nearby the terminal 10. The mobile devices 22 are relatively-small electronic devices of a type typically carried and owned by the individuals 26 and can provide a unique identifier 14 for each individual 26 and/or device 22.

The defined area 24 may be within a pre-determined distance from the terminal 10 itself, such as within a radius of one hundred meters, or can be an entranceway, doorway, or the like through which an individual 26 may have passed within recent history, such as within the last several hours. The size or shape of the defined area 24 can be designed to fit the needs of the terminal 10. For instance, the defined area 24 may be reduced for a highly crowded area, or expanded for an area less densely populated. As best illustrated in FIG. 1, the receiver 20 is able to detect the identifiers 14 being transmitted relative to the individuals 28 located within the pre-defined area 24; however, the receiver 20 is set such that it cannot receive and detect the identifiers 14 being transmitted relative to the individuals 30 located outside the pre-defined area 24.

Figure 2:
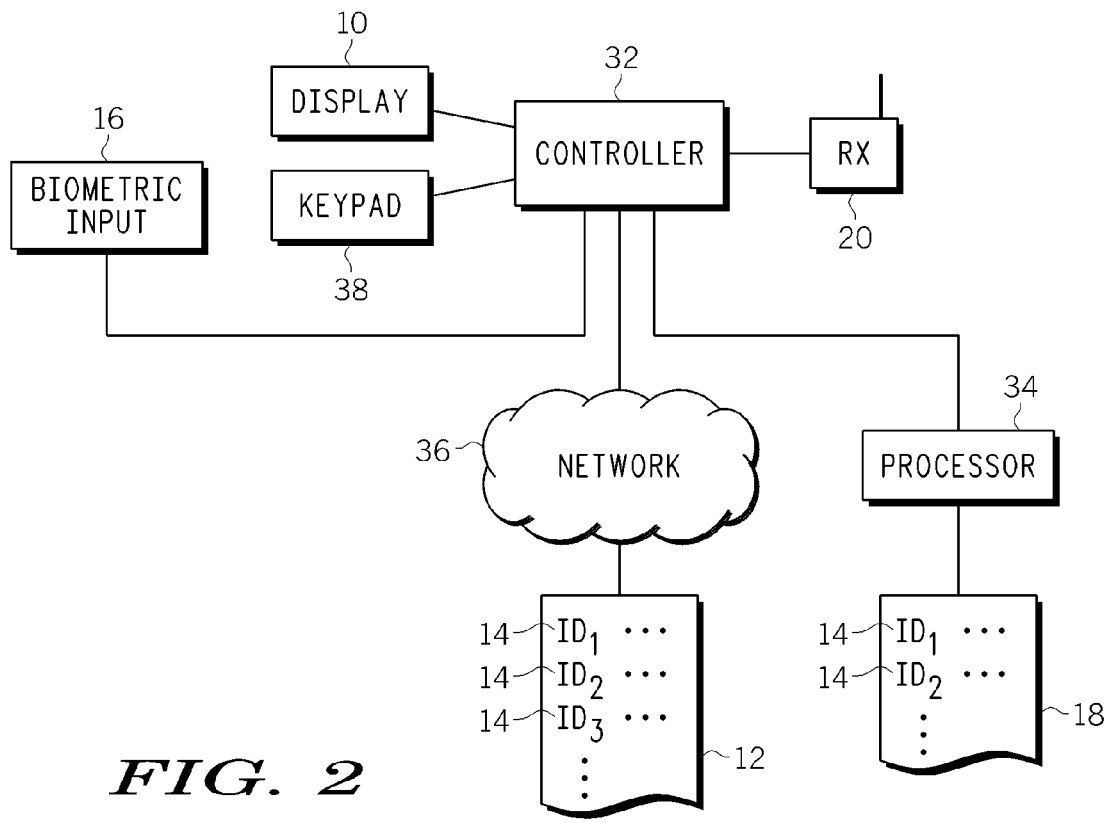
FIG. 2 illustrates an exemplary architecture of a public terminal in accordance with the principles of the invention.

As best illustrated in FIG. 2, the terminal 10 or an associated device has a keypad 38 or like interface device and a controller 32 and one or more computer processors 34 or the like for compiling in real-time identifier information received and detected by receiver 20. The processor creates a relatively-small temporary database of individuals 28 and/or mobile devices 22 that are present within the defined area 24 and that might ultimately desire access to private content via the public terminal 10. The compiled list of candidates is used to create the temporary database 18 of biometric data for these individuals 28. Accordingly, the temporary database 18 will clearly be of significantly reduced size in comparison with the parent database 12 containing the biometric data of all candidates.

Figure 3:
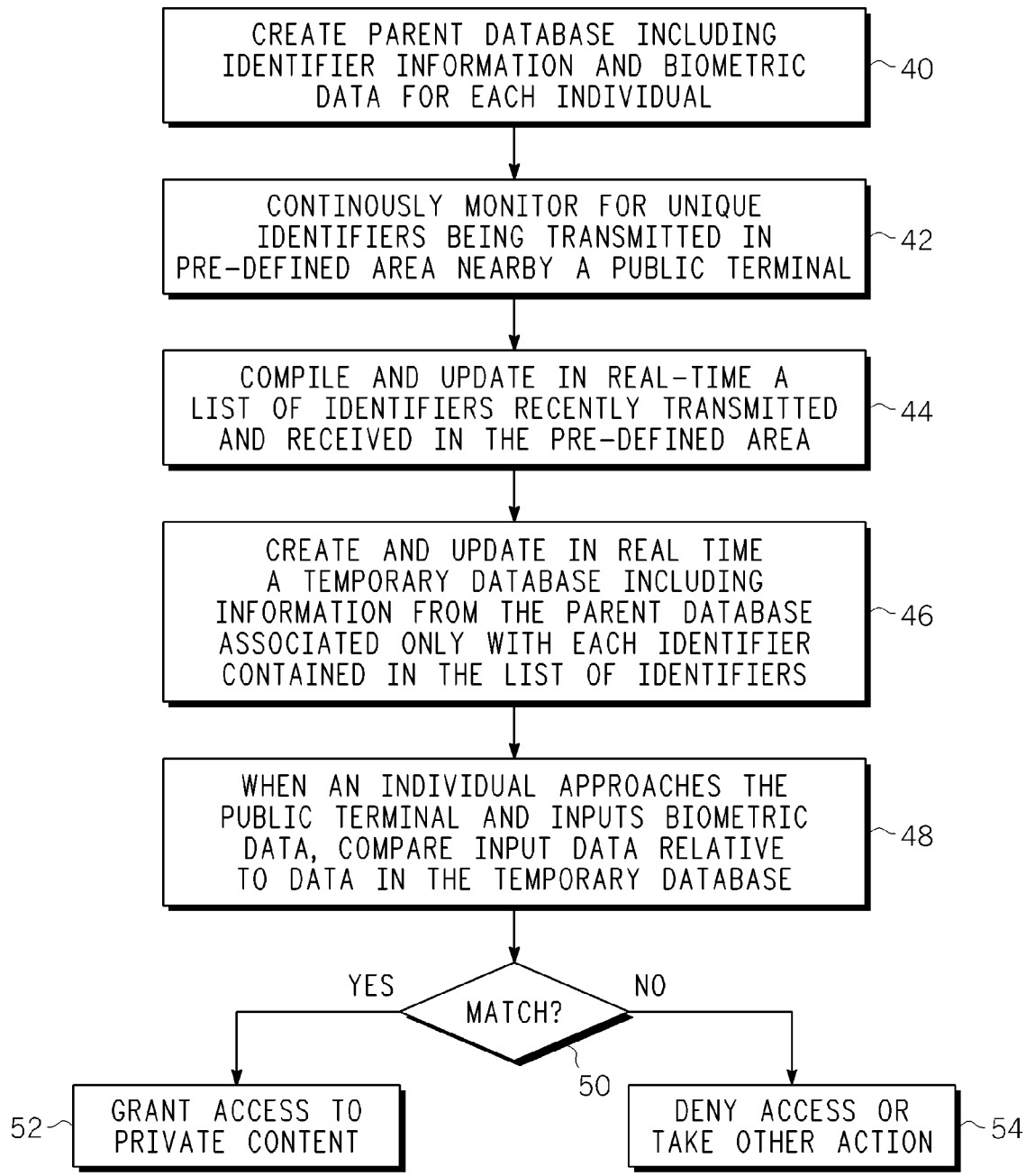
FIG. 3 is a diagram illustrating the steps of a first process in accordance with the principles of the present invention.

By way of example, the parent database 12 may contain biometric data for a million different potential users of the public terminal. This information is collected in advance of use of the public terminal. See step 40 in FIG. 3. The receiver 20 corresponding to a particular public terminal 10 continuously monitors and detects for identifiers 14 being transmitted within the pre-defined area 24. See step 40 in FIG. 3. This may result, for instance, in identifiers 14 being received corresponding to only twenty of the possible million of individuals 26 in the parent database 12. A list of identifiers recently detected by the receiver 20 is compiled and continuously updated based on the movements of the individuals 26 relative to the pre-defined area 24. See step 44 in FIG. 3. The biometric data is compiled in the temporary database 18 for the individuals 28 detected in the pre-determined area. See step 46. This can be accomplished by accessing data from the parent database 12 via a network connection 36 or the like for the detected individuals 28 and for downloading such information into the temporary database 18. This information and the temporary database 18 are continually updated/revised in real-time as more identifiers 14 are detected and others are no longer being received.

The biometric data of an individual 28 considered to be present within the defined area 24 is added to the temporary database 18 at a time before the individual 28 ever attempts access to content via the public terminal 10. This is true even if the individual 28 never actually attempts to use the public terminal 10. Accordingly, before the individual 28 approaches and begins to use the public terminal 10, his/her data has already been downloaded and compiled and is ready to be compared to biometric data input by users of the public terminal 10.

If during this timeframe one of the individuals 28 approaches the terminal 10 and attempts to gain access to private content via the public terminal 10, his/her fingerprint or like biometric is requested and taken by the public terminal 10 via use of the biometric input device 16. The controller 32 of the public terminal then initiates a comparison of the input biometric reading to information in the temporary database 18 compiled for the individuals 28 considered present within the defined area 24, not to the data contained in the parent database 12 containing millions of potential matches. See step 48 in FIG. 3. In this manner, the terminal 10 is capable of quickly (almost instantaneously) identifying a match or a non-match event from the limited potential matches in the temporary database 18 with a high level of confidence, and then is able to grant quick access, deny access, or take some other pre-determined action. See steps 50, 52 and 54 in FIG. 3.

It should be understood that the comparison of the biometric data is unrelated to the generation of the temporary database 18. There are no conclusions drawn from the receipt of an identifier 14 with respect to identify verification or authentication; rather, the receipt of the identifier 14 is only used to build the temporary database 18 which is continually updated. Access is granted only when the biometric information input into the public terminal 10 by an individual 28 matches one of the entries of biometric data contained in the temporary database 18. The sole purpose of the identifier 14 is to build the temporary database 18, not verify identity.

As discussed above, the identifiers 14 can be transmitted by mobile devices 22 which are carried by the individuals 26 as they physically pass through or within the immediate vicinity of the terminal 10. The mobile devices 22 can be wireless communication devices having cellular connectivity, proximity network capabilities, or the like. Examples of wireless communication devices can include cellular telephones, portable computers, personal digital assistants (PDAs) or like electronic devices, GPS devices, pagers, portable music/video devices, cameras, portable gaming devices, RF identification modules, or any other type of relatively-small and portable electronic device capable of transmitting a short range communication signal that contains a unique identifier 14 detectable by the public terminal 10 or its associated equipment.

The identifier 14 can be a communication signal in accordance with a suitable communication protocol, for instance, Bluetooth, ZigBee, or IEEE 802.11. The unique identifier may be a media access control (MAC) identifier, an Internet Protocol (IP) address, a device name, a user name, a telephone number, or any other identifier that is uniquely assigned to the wireless communication device. The media access control (MAC) identifier, Internet protocol (IP), telephone number, or any other identifier should be capable of being automatically recognized and obtained by the public terminal 10 without having to establish a two-way communication link with the wireless communication device. Rather, the public terminal 10 is merely required to monitor and detect for communication signals or identifiers 14 being emitted in the pre-determined area 24, and for any signals or identifiers received, to decode the information received so that related information can be compiled in the temporary database 18.

Figure 4:
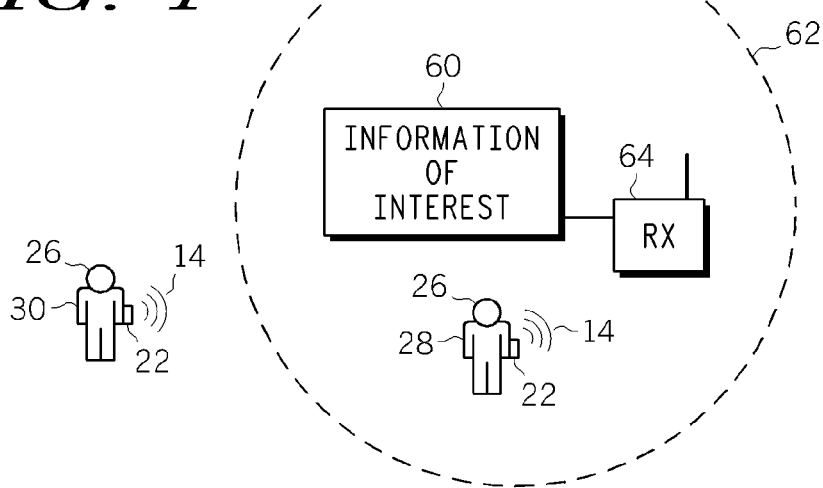
FIG. 4 schematically illustrates a second embodiment of a public terminal and pre-defined area in accordance with the principles of the invention.

FIG. 4 relates to an alternate embodiment of a public terminal 60 for displaying public data. In this embodiment, identifiers 14 or like communication signals transmitted within the immediate vicinity 62 of the public terminal 60 are monitored and detected by a receiver 64 for purposes other than identity verification. For instance, the information displayed on the terminal 60 can be based on information contained by or transmitted with the identifier 14 and that is received by the public terminal 60. In this case, the public data is information considered to be of particular interest to the individual identified via detection of the identifier 14. For example, a traveler at an airport may automatically see departure and/or arrival flight information of interest when the traveler sits or stands adjacent the terminal 60. In this instance, the public terminal 60 recognizes geographic information associated with the identifier 14 (i.e. the area code of a telephone number) and displays information considered relevant to a traveler from that geographic region.

Alternatively, the public terminal 60 may display an advertisement based on information associated with the identifier 14 of the individual sitting or standing adjacent the terminal 60. For instance, advertisements may be provided in a particular foreign language or may be directed to a specific gender, age range, or other parameter. Still further, the identifier 14 can contain information causing the public terminal 60 to automatically connect to a particular network, home page, e-mail system, account, or the like relevant to the individual.

Figure 5:
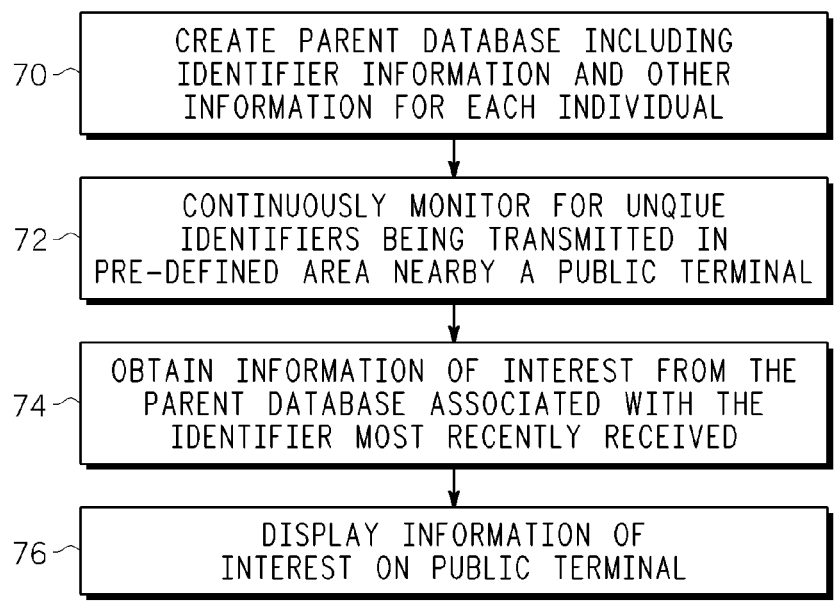
FIG. 5 is a diagram illustrating the steps of a second process in accordance with the principles of the present invention.

FIG. 5 provides one example of a contemplated process for use of the public terminal 60. A database can be prepared with respect to identifier information and other information relative to individuals. See step 70 in FIG. 5. The receiver 64 monitors for identifiers 14 being transmitted adjacent the public terminal 60. See step 72 in FIG. 5. The database is accessed and information of interest is displayed on the public terminal 60 corresponding to the identifier 14 that was last detected by the public terminal. See steps 74 and 76 in FIG. 5.

While the principles of the invention have been described above in connection with specific methods and systems, it is to be clearly understood that this description is made only by way of example and not as limitation on the scope of the invention as defined in the appended claims.

I claim:

1. A method for authenticating the identity of a user of a public terminal, comprising the steps of:
   automatically detecting a unique identifier being transmitted in a pre-defined area adjacent or nearby the public terminal with a receiver of the public terminal;
   electronically requesting, from a remote storage location, first identity verification data corresponding to the unique identifier;
   electronically receiving, from the remote storage location, the first identity verification data;
   electronically storing the first identity verification data local to the public terminal;
   electronically comparing second identity verification data input into the public terminal by the user with the first identity verification data to determine whether the second identity verification data and the first identity verification data match; and
   granting access to the user to private content via the public terminal if the second identity verification data and the first identity verification data match.

2. The method according to claim 1, further comprising the step of creating a parent database at the remote storage location containing and storing identity verification data for all potential users of the public terminal.

3. The method according to claim 2, wherein during said step of storing the first identity verification data local to the public terminal, using the identity verification data contained in the parent database to generate the data stored local to the public terminal.

4. The method according to claim 3, wherein the first identity verification data is password or username data.

5. The method according to claim 3, wherein the first identity verification data is biometric data.

6. The method according to claim 5, wherein the biometric data is selected from the group consisting of fingerprint data, retinal pattern data, voice or speech data, hand geometric data, and face geometric data.

7. The method according to claim 1, wherein said step of detecting the unique identifier includes detecting a unique media access control (MAC) identifier of a wireless communication device present in the pre-defined area.

8. The method according to claim 1, wherein said step of detecting the unique identifier includes detecting an Internet Protocol (IP) address a wireless communication device present in the pre-defined area.

9. The method according to claim 1, wherein said step of detecting the unique identifier includes detecting a short range communication signal transmitted by a device selected from the group consisting of a cellular telephone, portable computer, personal digital assistant (PDA), GPS device, pager, portable music or video device, camera, portable gaming device, and RF identification module.

10. A method for displaying information of interest to an individual adjacent a public terminal, comprising the steps of:
   automatically detecting a unique identifier being transmitted in the immediate vicinity of the public terminal with a receiver of the public terminal;
   electronically identifying, on a remote storage location, an advertisement based on information associated with the unique identifier; and
   electronically displaying the advertisement on a display of the public terminal.

11. The method according to claim 10, further comprising the step of creating a parent database at the remote storage location containing and storing data for all potential users of the public terminal.

12. The method according to claim 11, wherein during said step of identifying the advertisement, accessing the data stored in the parent database to identify the advertisement.

13. The method according to claim 10, wherein said step of detecting the unique identifier includes detecting a unique media access control (MAC) identifier of a wireless communication device present in the pre-defined area.

14. The method according to claim 10, wherein said step of detecting the unique identifier includes detecting an Internet Protocol (IP) address a wireless communication device present in the pre-defined area.

15. The method according to claim 10, wherein said step of detecting the unique identifier includes detecting a short range communication signal being transmitted by a device selected from the group consisting of a cellular telephone, portable computer, personal digital assistant (PDA), GPS device, pager, portable music or video device, camera, portable gaming device, and RF identification module.

16. A system for authenticating the identity of a user of a public terminal, comprising:
   a public terminal freely accessible by a large number of users;
   a receiver for detecting a unique identifier transmitted in a pre-defined area adjacent or nearby the public terminal; and
   one or more computer processors for requesting, from a remote storage location, first identity verification data corresponding to the unique identifier, for receiving, from the remote storage location, the first identity verification data, for storing the first identity verification data local to the public terminal, for comparing second identity verification data input into the public terminal by a user with the first identity verification data to determine whether the second identity verification data and the first identity verification data match, and for granting access to the user to private content via the public terminal if the second identity verification data and the first identity verification data match.

17. The system according to claim 16, further comprising a parent database at the remote storage location containing and storing identity verification data for all potential users of the public terminal.

18. The system according to claim 17, wherein the first identity verification data is password or username data.

19. The system according to claim 17, wherein the public terminal includes a biometric entry device, wherein the second identity verification data is biometric data, and wherein the biometric data is selected from the group consisting of fingerprint data, retinal pattern data, voice or speech data, hand geometric data, and face geometric data.

20. The system according to claim 19, wherein said unique identifier includes a unique media access control (MAC) identifier of a wireless communication device present in said pre-defined area or an Internet Protocol (IP) address of a wireless communication device present in the pre-defined area, and wherein the wireless communication device is selected from the group consisting of a cellular telephone, portable computer, personal digital assistant (PDA), GPS device, pager, portable music or video device, camera, portable gaming device, and RF identification module capable of transmitting said unique identifier as a short-range communication signal.

* * * * *